United States Patent [19]
Jones

[11] 3,883,129
[45] May 13, 1975

[54] CLAMPING DEVICE

[76] Inventor: Sterling B. Jones, 858 Duff Ave., West Covina, Calif. 91790

[22] Filed: Oct. 5, 1972

[21] Appl. No.: 295,281

[52] U.S. Cl..................... 269/49; 85/81; 151/19 R
[51] Int. Cl............................................ F16b 13/04
[58] Field of Search............ 269/47, 49; 85/81, 5 E, 85/5 M, 5 N; 151/19 R, 20

[56] References Cited
UNITED STATES PATENTS

| | | | |
|---|---|---|---|
| 747,270 | 12/1903 | Taylor | 269/174 |
| 750,675 | 1/1904 | Michelin | 151/19 R |
| 1,806,506 | 5/1931 | Savidge | 151/19 R |
| 2,398,962 | 2/1946 | Randrup | 269/47 X |

FOREIGN PATENTS OR APPLICATIONS

| | | | |
|---|---|---|---|
| 887,862 | 8/1943 | France | 269/47 |

*Primary Examiner*—Roy Lake
*Assistant Examiner*—Neil Abrams
*Attorney, Agent, or Firm*—Forrest J. Lilly

[57] ABSTRACT

A device for clamping two or more work sheets together or for clamping an object to a structure comprises a main body having a head end to contact one side of the work, a tension member axially slidable in the main body and having a gripper head to engage the opposite side of the work, and an actuator for locking the tension member in clamping position. In preferred form, the main body is a sleeve with an axial passage to slidably receive the tension member, and the actuator is a collar slidable on the sleeve. The major portion of the length of the tension member is in the form of a stem protruding beyond the aft end of the sleeve and collar. The device may be operated by a tool having a pusher engaging the head end of the main body to force it against the work, a puller to grip the aft end of the tension member and pull it into clamping position, and a second pusher to push the collar forward to locking position. The collar has a cam member, preferably a conical seat, which engages at least a portion of the aft end of the sleeve and deflects it laterally into binding engagement with the stem of the tension member. In one form the entire sleeve tilts, and in another form the sleeve is split into tongues which are resiliently forced radially inward to lock the stem.

11 Claims, 8 Drawing Figures

CLAMPING DEVICE

BACKGROUND OF THE INVENTION

This invention lies in the field of clamping devices of the type commonly known as temporary fasteners. Such fasteners may be used for many purposes but their most prevalent use is in fastening together two or more work pieces such as elements of aircraft structure to hold them in proper relation while permanent fasteners, such as rivets, are applied. The temporary fasteners are then removed and replaced by additional rivets.

In many fields, and particularly in the field of aircraft construction, it has been a common practice to use a few temporary fasteners to hold two or more pieces of structure such as skin sheets in predetermined relation while rivets are inserted in pre-drilled holes or holes drilled in place, the temporary fasteners having been installed in locating holes. The temporary fasteners are then replaced by additional rivets.

The first fasteners used for this purpose were simple bolts and nuts. Their application and removal were time-consuming and frequently required an operator at each side of the work. An early improvement was a device which had a body to apply to the first side of the work and a tension element slidable through the body and having an expandable head which could pass through the aligned rivet holes, expand on the remote side, and then be pulled back to clamp the sheets together. A coil spring was used to apply the tension and a plier-like tool was used to overcome the spring and initially force the tension member forward. This was a substantial advance because the fastener could be applied from the near side and required minimum time. However, as the work pieces became thicker and stiffer, they required more force to pull them tightly together than could be produced by a spring which could be manipulated by the manual tool. The required force in some cases may exceed 100 pounds.

For heavy duty work, another type of clamping device was developed which used a similar body and tension member with the same type of expandable gripper head but was provided with single or multiple screw thread mechanisms to advance and retract the tension member. These devices were operated by complicated rotating tools using air or electric motors. While this class of fastener performs well and can be made to apply very high clamping forces, the individual fastener is difficult and expensive to manufacture and has a relatively short life because of wear or damage to the screw threads. In addition it requires a complicated and expensive applying tool.

SUMMARY OF THE INVENTION

The present invention preserves the benefits mentioned above while overcoming the disadvantages of the prior devices and provides a clamp or temporary fastener which is relatively simple and easy to manufacture at greatly reduced cost. In addition it may be operated with a relatively simple tool.

Generally stated, and in presently preferred form, the clamping device of the present invention comprises three principal components, a main body, a tension member, and an actuator. The main body is generally in the form of a sleeve having a head end for engagement with the work and an aft end, and is formed with an axial passage therethrough. The tension member comprises an elongate stem axially slidable in the sleeve, having a gripper head at its forward end protruding forward of the head end of the main body and an aft end protruding beyond the aft end of the main body to be gripped by the puller mamber of an applying tool. The actuator is preferably a collar which is axially slidably mounted on the sleeve and movable forward for locking and aft for releasing. The collar is provided with abutment means in the form of an internal concical seat which engages at least a portion of the aft end of the sleeve to deflect it laterally into binding engagement with the stem of the tension member when the collar is moved forward.

A simple applying tool comprises an air cylinder and piston having a forwardly extending piston rod with gripping means at its forward end to engage the aft end of the tension member. A first tubular pusher member connected to the cylinder pushes the head end of the main body tightly against the work while aft movement of the piston pulls the tension member into clamping position. A second tubular pusher memeber connected to the cylinder then pushes the collar forward to deflect an aft portion of the sleeve into binding engagement with the tension member stem. Use of the power tool is not necessary for release of the clamping device. The plier-type tool used with the early type of fasteners can be applied directly to pull the collar rearward to release position.

BRIEF DESCRIPTION OF THE DRAWINGS

Various other advantages and features of nevelty will become apparent as the description proceeds in conjunction with the accompanying drawings, in which.

DESCRIPTION OF PREFERRED EMBODIMENTS

Figure 1:
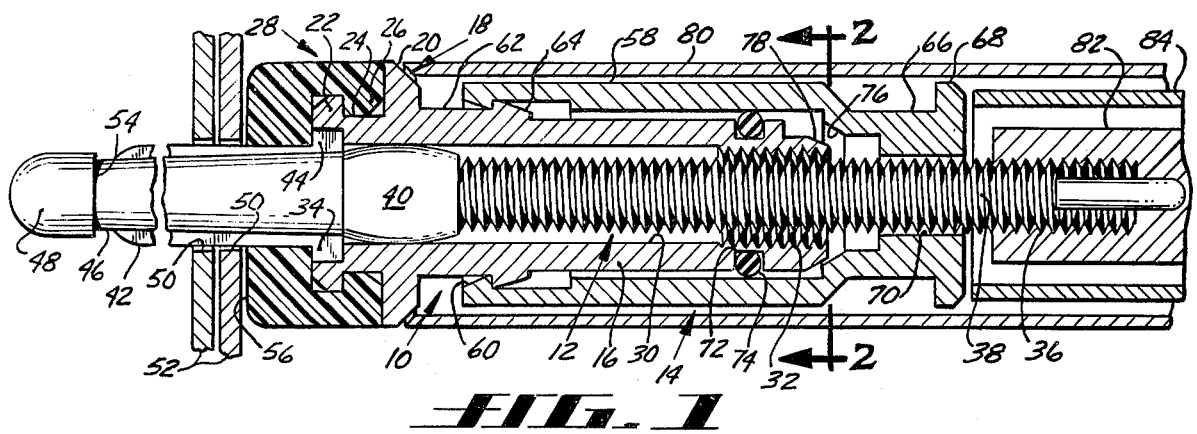
FIG. 1 is a schematic view in longitudinal section of a first form of the fastener of the invention, also showing schematically the actuating components of an applying tool.

A first form of clamping device incorporating the features of the invention is schematically illustrated in FIG. 1, in which the principal components are an elongate main body 10, an elongate tension member 12, and an actuator 14. The main body is essentially a sleeve 16 with a head end 18 including a flange 20 for engagement by a presser foot of an applying tool, and a flange 22 axially spaced from flange 20 to form an annular recess 24 to receive the in-turned flange 26 of tip member 28. The latter is formed of resilient elastomeric material to maintain an elastic compression force when the fastener is in use. The sleeve is formed with a coaxial longitudinal bore 30 to slidably receive the tension member, and at its aft end is provided with a plurality of longitudinally spaced serrations 32 which are preferably in the form of an internal screw thread. The forward face of the head end is provided with a counterbore 34 to receive a part of the gripping device later described, which is retained in place by the inner portion of the tip member.

The aft portion of tension member 12 consists of a stem 36, at least a portion of which is provided with a plurality of longitudinally spaced serrations 38 which are preferably in the form of an external screw thread. The interior of screw thread 32 is slightly larger than the exterior of screw thread 38 so that the latter can normally move axially in the former without binding engagement. The forward end of the stem includes a guide block 40 which is freely slidable in bore 30, The gripping device itself is standard in the industry and has been used for many years. It includes a flat blade 42, known as a spreader, with a pair of ears 44 at its aft end which are seated in counterbore 34 and retained in place by the tip member so that the spreader is stationary. A pair of needles 46 are fixedly secured to the guide block for fore and aft movement with the stem, with one needle lying on each face of the spreader, and each needle is provided with a radially enlarged gripper head 48. When the needles are fully extended, as in FIG. 1, the heads approach each other radially to reduce their diametral extent. Consequently, they are enabled to pass through the aligned holes 50 in work pieces 52. When the needles are retracted by aft movement of the stem, camming members on the inner sides of the needles, not shown, engage the faces of the spreader to force the gripper heads apart to such an extent that their rear shoulders 54 will engage the remote side of the work and clamp it against face 56 of tip member 28.

After gripper head 48 and tip member face 56 have been drawn together to clamp the work tightly between them it is necessary to hold them in clamping relation util their function has been completed. To accomplish this, the aft end of sleeve 16 is deflected transversely of the axis of stem 36 to cause serrations 32 to enter into binding engagement with serrations 38 on the stem. To this end, actuator 14 takes the form of an elongate collar 58 surrounding and slidably mounted on sleeve 16. A small internal flange 60 at the forward end of the collar rides on neck 62 of the sleeve and also serves as a detent engaging detent 64 on the sleeve to provide limited axial movement and to prevent separation of the components. At its aft end, the collar is reduced in both inside and outside diameter. The outside diameter 66 cooperates with flange 68 to constitute a formation to receive a releasing tool. At the aftmost portion the collar is formed with a bore 70 which freely slidably receives stem 36.

Figure 3:
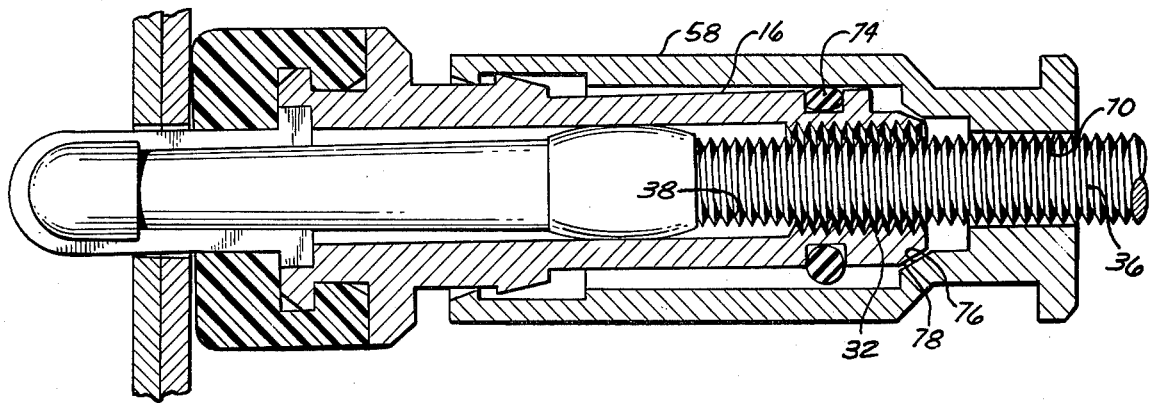
FIG. 3 is a view similar to FIG. 1, showing the locked condition of the tension member.

An annular external recess 72 is formed on the aft portion of the sleeve to receive ring 74 of elastomeric material. The ring normally fills the radial gap between the inner wall of the collar and the base of the recess and resiliently maintains the collar coaxial with the sleeve, while the collar in turn maintains stem 36 coaxial with both. When the sleeve is tilted, as shown in FIG. 3, a local portion of the ring is compressed and thus stores up energy to re-centralize the sleeve at the appropriate time.

Figure 2:
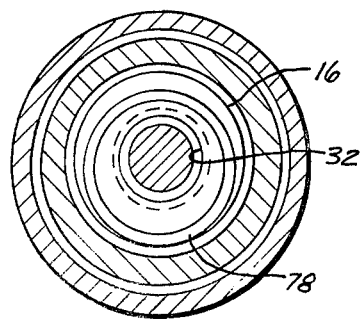
FIG. 2 is an end view of the main body taken on line 2—2 of FIG. 1.

Returning to FIG. 1, it will be seen that a conical seat 76 is formed at the aft portion of collar 58 and a matching conical seat 78 is formed at the aft end of the sleeve. Both seats may be formed to diverge rearwardly but the forwardly diverging arrangement shown is preferred. When the stem, sleeve, and collar are all coaxial, the two seats are eccentric with respect to each other, and either seat may be on center and the other one off center. The preferred form is shown with the collar seat concave and concentric and the sleeve seat convex and eccentric. This eccentric relation is illustrated in FIG. 2.

The locking effect is accomplished by pushing collar 58 axially forward on sleeve 16. As viewed in FIG. 1, the lower portion of seat 76 will engage the lower portion of seat 78 and exert a camming action on it to force the two seats into approximate concentricity. The result is that the aft end of sleeve 16 is deflected or tilted transversely with respect to the axis of stem 36 until serrations 32 bindingly engage serrations 38 as illustrated in FIG. 3. At the same time an upper local portion of ring 74, as viewed in FIG. 3, is compressed and stores up energy. When the collar is retracted to releasing position, the stored up energy re-centralizes the sleeve.

Various types of tools may be used for applying the clamping device. While it forms no part of the present invention, a few elements of a suitable tool are shown in FIG. 1 to illustrate the mode of operation. A pneumatic motor having a cylinder and pistion is provided. A first tubular pusher element 80 connected to the cylinder is pressed against flange 20 to force the main body against the work. A gripping tool or clutch 82 connected to the piston rod grips the aft end of stem 36 and is pulled rearward by the piston to retract it to clamping position. Then a second tubular pusher element 84 connected to the cylinder is pushed against flange 68 to force the collar forward to locking position. The standard plier-type tool may be used to retract collar 58 with respect to stem 36 to release the fastener.

Figure 4:
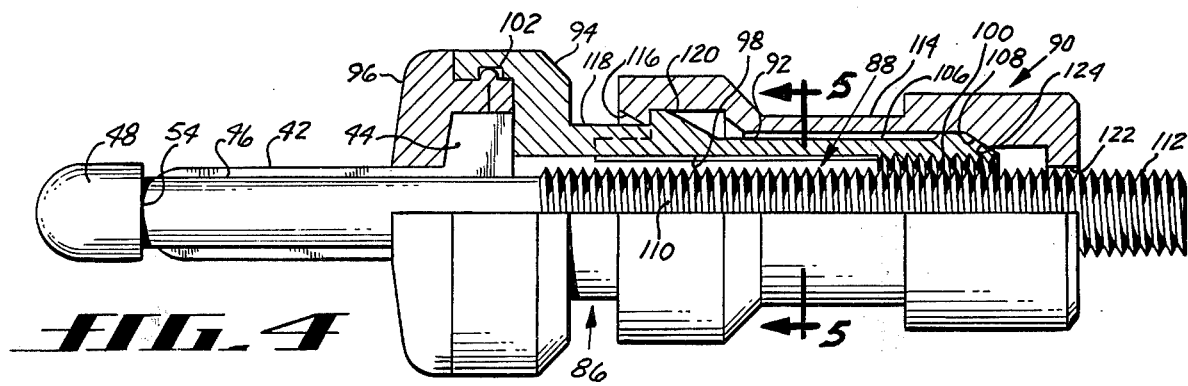
FIG. 4 is a view similar to FIG. 1 showing a second form of the fastener.
Figure 5:
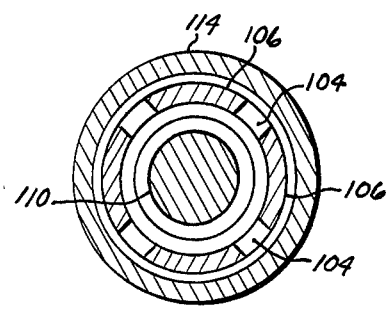
FIG. 5 is a sectional view taken on line 5—5 of FIG. 4.
Figure 6:
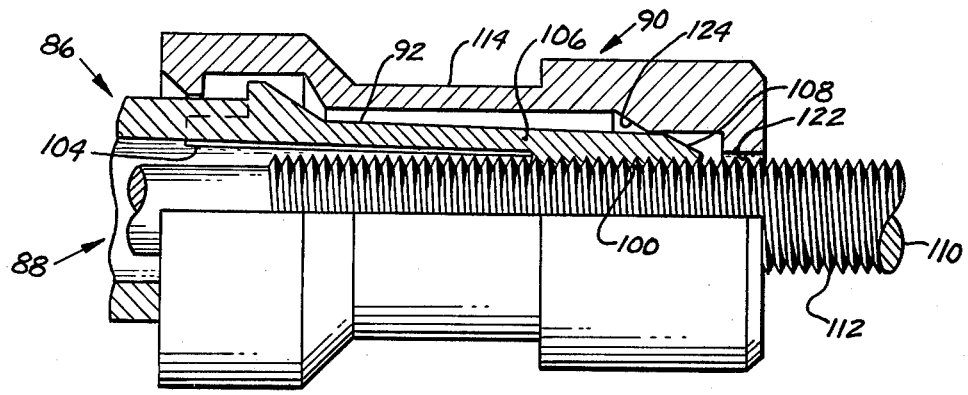
FIG. 6 is a view similar to FIG. 4 showing the locked condition of the tension member.

A modified type of fastener incorporating the features of the invention is illustrated in FIGS. 4, 5, and 6. This type embodies the same three basic components, main body 86, tension member 88, and actuator 90. The main body comprises a sleeve 92 having a head end 94 provided with a tip member 96 and having an axial passage 98 therethrough with internal longitudinally spaced serrations 100 in the aft portion, the serrations preferably being in the form of an interrupted screw thread. Tip member 96 is shown as a metallic member swaged into recess 102, but this portion of the fastener may be made in the same manner as in FIG. 1.

Sleeve 92 is provided with a plurality of peripherally spaced slits 104 through its wall, as shown in FIG. 5, and extending longitudinally through the major part of its length from the aft end, as shown in FIG. 4, to provide a plurality of elongate tongues 106. The material of the main body is metallic and the tongues can be resiliently deflected from their normal position. The aft end of the sleeve is formed with a convex conical seat 108.

Tension member 88 includes a stem 110 provided with longitudinallly spaced serrations 112 to match serrations 100 of the sleeve, preferably in the form of an external screw thread freely axially movable between the serrations 100 when tongues 106 are in normal, inoperative position. At the forward end of the stem, the same gripping device is provided as in FIG. 1 and operates in the same way.

Actuator 90 comprises a collar 114 having an internal flange 116 riding on neck 118 of the sleeve and serving as a detent to engage detent 120 on the sleeve, providing limited axial movement and preventing separation. A bore 122 in the aft end of the collar slidably receives stem 110 and maintains it coaxial with the sleeve and collar. An internal conical seat 124 in the aft end of the collar is arranged to overlie the aft end of the sleeve in camming relation. After the tension member has been pulled to clamping position, collar 114 is forced forward to locking position and conical seat 124 deflects all of the tongues transversely with respect to the axis of the tension member to cause serrations 100 to enter into binding engagement with serrations 112 on the stem as shown in FIG. 6. When the collar is retracted, the resilience of the tongues springs them back to normal position and the tension member is released.

Figure 7:
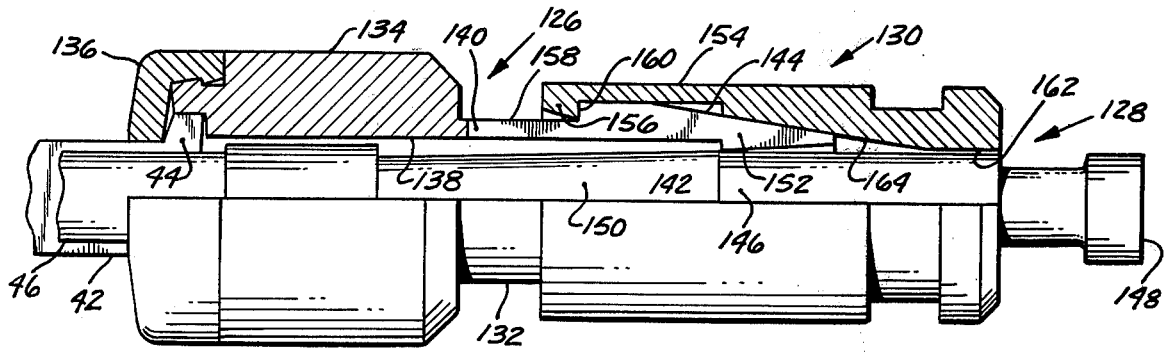
FIG. 7 is a view similar to FIG. 1, showing a third form of the fastener.

A further modification incorporating the features of the invention is illustrated in FIGS. 7 and 9. This type also includes a main body 126, tension member 128, and actuator 130. The main body comprises a sleeve 132 having a head end 134 provided with a tip member 136 and having an axial passage 138 therethrough. Tip member 136 is shown as a metallic member snapped over a flange on head end 134 but this portion of the fastener may be made in the same manner as in FIG. 1.

Sleeve 132 is provided with a plurality of peripherally spaced slits 140 through its wall and extending longitudinally from the aft end to provide a plurality of elongate tongues 142. The material of the main body is metallic and the tongues can be resiliently deflected from their normal position. The aft end of the sleeve is formed with a convex conical seat 144 and the inner faces of the aft ends of the tongues are formed with gripper feet 152.

Tension member 128 includes a stem 146 provided at its aft end with a pulling head 148 instead of the serrations of the previous forms. At the forward end of the stem, the same gripping device is provided as in FIG. 1 and operates in the same way. An intermediate portion 150 of stem 146 is formed as a small angle rearwardly divergent cone having its aft terminus in the vicinity of the forward ends of the gripper feet when the tension member is in its forward position, as illustrated in FIG. 7.

Figure 8:
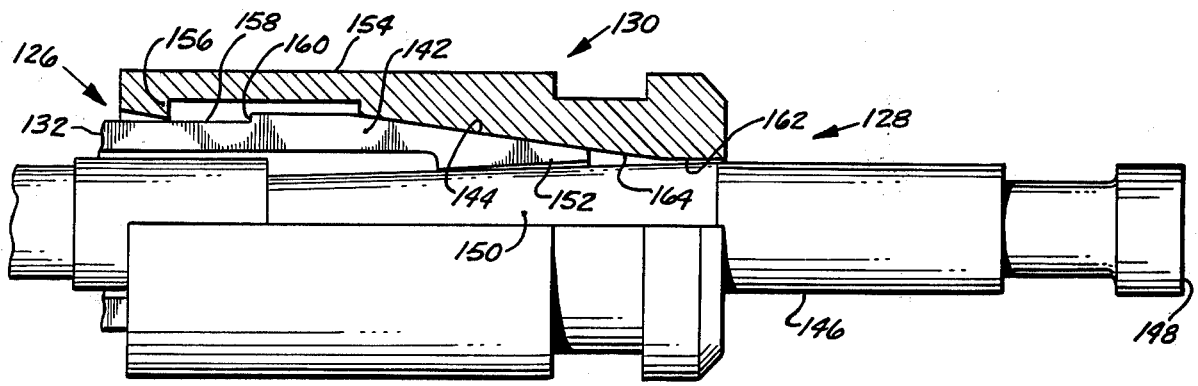
FIG. 8 is a view similar to FIG. 7 showing the locked condition of the tension member.

Actuator 130 comprises a collar 154 having an internal flange 156 riding on neck 158 of the sleeve and serving as a detent to engage detent 160 on the sleeve, providing limited axial movement and preventing separation. A bore 162 in the aft end of the collar slidably receives stem 146 and maintains it coaxial with the sleeve and collar. An internal conical seat 164 in the aft end of the collar is arranged to overlie the aft end of the sleeve in camming relation. After the tension member has been pulled to clamping position as shown in FIG. 8, a reduced diameter portion of the conical section of the stem is in radially opposed relation to the gripper feet. Collar 154 is then forced forward to locking position and conical seat 164 deflects all of the tongues transversely with respect to the axis of the tension member to cause the gripper feet 152 to enter into binding engagement with section 150. Since the tension member cannot move forward without spreading the gripper feet and such spreading is positively prevented by the position of the collar, the tension member is effectively locked in its clamping position. When the collar is retracted, the resilience of the tongues springs them back to normal position and the tension member is released.

Another feature of the invention resides in the novel method of permanently assembling the actuator and the body into overlapping relation. Once they are assembled, it is desirable to prevent any disassembly so that the internal cooperating elements cannot be subjected to any damage.

This feature will be explained with reference to FIG. 1 as an example. It will be noted that the actuator or collar 58, which is a sleeve-like member is provided at its forward end with an integral continuous uninterrupted inwardly extending peripheral flange or detent ring 60 which is in locking relation with neck 62 after assembly is accomplished. The main body 10 is provided with an integral continuous uninterrupted outwardly extending peripheral flange or detent ring 64 which cooperates with ring 60 to maintain the parts in assembled relation. Both of these members are formed of high strength metal in order to sustain the loads placed on them in operation and to withstand the rough usage which they receive by the operators.

The ordinary method of assembling such parts is to make the free end of the collar oversize so that the ring 60 will move freely over ring 64 into the position shown and then swage the end of the collar inward until ring 60 is seated. This is a difficult operation to perform with precision. If the swaging is insufficient, ring 60 may be too loose to serve properly as a detent. If the swaging is overdone, ring 60 may bind on neck 62 and prevent free axial movement. The normal springback of steel and other strong metals increases the difficulty of proper sizing. Moreover, such swaging operation is time consuming and costly.

The present assembly method is very simple by comparison and yet produces excellent results. Both of the rings are formed to precise predetermined dimensions before assembly and one or both of them may be provided with a peripheral camming surface adapted to contact the opposing ring. The members are then arranged in coaxial alignment with the camming surface of one member in pressural contact with the ring of the other member. Very high axial force is then applied to the members to drive them toward each other and the action of the camming surface, regardless of which ring is so formed, will force ring 60 to momentarily expand against the elastic resistance of the metal to a sufficient extent to ride over ring 64 and snap into locking relation with neck 62 on the remote side of ring 64. Since it springs back to its original manufactured size, it will always have its predetermined sliding fit on neck 62. It will be seen that this method takes only seconds to perform and requires a minimum amount of equipment, whether the axial force is provided by a press or by an impact tool.

I claim:

1. A clamping device for use in clamping work having an opening therethrough, comprising:
   an elongate main body having a head end and an aft end and formed with an axially extending passage therethrough;
   the head end having an end face adapted to engage the work to be clamped;
   an elongated tension member axially slidably mounted in the passage for free longitudinal extending and retracting movement therethrough and having a forward end projecting through the head end of the main body to pass through the work and an aft end projecting through the aft end of the main body;

the tension member having a radially expansive gripper head spaced forward of the end face of the main body in extended position and adapted to enlarge radially from a contracted position, in which can pass through the work to an expanded size to engage the remote side of the work and clamp the work between the gripper head and the end face in response to retracting movement of the tension member;

the head end of the main body having a formation for engagement by the pusher element of an applying tool and the aft end of the tension member having a formation for engagement by the puller element of the tool for producing the clamping action;

an actuator carried by the main body and movable thereon to deflect at least a portion thereof transversely of the axis of the tension member into binding engagement with the tension member to lock it in clamping position, said actuator being in the form of a collar coaxially mounted on and axially slidable on the main body to a forward locking position and an aft releasing position;

said collar being provided with an actuator portion arranged in camming relation with an aft portion of the main body to displace it laterally in response to forward movement of the collar and to release it for return to normal position in response to aft movement of the collar; and cooperating detent means formed on the collar and the main body to permit limited axial movement and prevent separation;

the aft end of the collar extending beyond the aft end of the main body and being provided with a central axial guide aperture sized to freely slidably receive the aft portion of the tension member and normally maintain it on a coaxial path with the collar and out of binding engagement with the aft portion of the main body.

2. A clamping device for use in claimping work having an opening therethrough, comprising:

an elongate main body having a head end and an aft end and formed with an exially extending passage therethrough;

the head end having an end face adapted to engage the work to be clamped;

an elongated tension member axially slidably mounted in the passage for free longitudinal extending and retracting movement therethrough and having a forward end projecting through the head end of the main body to pass through the work and an aft end projecting through the aft end of the main body;

the tension member having a radially expansive gripper head spaced forward of the end face of the main body in extended position and adapted to enlarge radially from a contracted position, in which can pass through the work, to an expanded size to engage the remote side of the work and clamp the work between the gripper head and the end face in response to retracting movement of the tension member;

the head end of the main body having a formation for engagement by the pusher element of an applying tool and the aft end of the tension member having a formation for engagement by the puller element of the tool for producing the clamping action; and an actuator carried by the main body and movable thereon to deflect at least a portion thereof transversely of the axis of the tension member into binding engagement with the tension member to lock it in clamping position;

said main body being in the form of a sleeve provided at its aft end with a conical seat;

the actuator being in the form of a collar surrounding and axially slidable on the sleeve and provided internally with a conical seat in opposing relation to the seat on the sleeve;

and the seats being eccentric with respect to each other when the sleeve and collar are coaxially aligned;

relative axial movement of the collar on the sleeve toward locking position causing the collar seat to engage the sleeve seat eccentrically and deflect the aft end ot the sleeve into binding engagement with the tension member.

3. A device as claimed in claim 2, wherein the conical sleeve seat is located eccentrically with respect to the axis of the sleeve.

4. A device as claimed in claim 2, wherein both of the conical seats are convergent rearwardly.

5. A device as claimed in claim 2, wherein a resilient member is connected to the sleeve to yieldingly resist deflection of the aft end of the sleeve from coaxial relation with the collar.

6. A device as claimed in claim 1, wherein the aft end of the sleeve is formed with an external annular recess;

a ring of resilient elastomeric material is seated in the recess in contact with the periphery of the inner wall of the collar when the sleeve and collar are in coaxial alignment;

and a local portion of the ring is radially compressed in response to deflection of the sleeve by locking movement of the collar and serves to re-centralize the sleeve upon releasing movement of the collar.

7. A device as claimed in claim 1, wherein the main body is in the form of a sleeve having a plurality of elongate peripherally spaced slits through its wall extending axially forward from its aft end to define a plurality of axial tongues positioned normally out of binding engagement with the tension member;

and the collar is formed internally with a forwardly divergent conical seat;

the seat being arranged to overlie the tongues and deflect them radially inwardly upon forward movement of the collar to force them into binding engagement with the tension member to lock it in clamping position.

8. A device as claimed in claim 7, wherein the tongues are resilient and yieldably deflect to binding position, and resiliently return to normal position out of binding engagement with the tension member upon releasing movement of the collar and its seat.

9. A device as claimed in claim 7, wherein the tension member is provided with a plurality of axially spaced external serrations and the aft ends of the tongues are provided with a plurality of matching serrations which in the normal positions of the sleeves axially clear the serrations on the tension member but which engage the serrations on the tension member and increase the binding engagement when deflected radially inward by said conical seat in said collar.

10. A device as claimed in claim 9, wherein the serrations on the tension member are in the form of an external screw thread and the serrations on the tongues are in the form of an interrupted internal screw thread of the same pitch but of sufficiently larger diameter to surround the external thread without binding when the tongues are in normal inoperative position.

11. A clamping device for use in clamping work having an opening therethrough, comprising:
  an elongate main body having a head end and an aft end and formed with an axially extending passage therethrough;
  the head end having an end face adapted to engage the work to be clamped;
  an elongated tension member axially slidably mounted in the passage for free longitudinal extending and retracting movement therethrough and having a forward end projecting through the head end of the main body to pass through the work and an aft end projecting through the aft end of the main body;
  the tension member having a radially expansive gripper head spaced forward of the end face of the main body in extended position and adapted to enlarge radially from a contracted position, in which it can pass through the work to an expanded size to engage the remote side of the work and clamp the work between the gripper head and the end face in response to retracting movement of the tension member;
  the head end of the main body having a formation for engagement by the pusher element of an applying tool and the aft end of the tension member having a formation for engagement by the puller element of the tool for producing the clamping action;
  an actuator carried by the main body and movable thereon to deflect at least a portion thereof transversely of the axis of the tension member into binding engagement with the tension member to lock it in clamping position, said actuator being in the form of a collar coaxially mounted on and axially slidable on the main body to a forward locking position and an aft releasing position;
  said collar being provided with an actuator portion arranged in camming relation with an aft portion of the main body to displace it laterally in response to forward movement of the collar and to release it for return to normal position in response to aft movement of the collar;
  an intermediate portion of the tension member being in the form of a long-uninterrupted rearwardly divergent conical stem of relatively small taper; and
  the aft end of the collar extending beyond the aft end of the main body and being provided with a central axial guide aperture sized to freely slidably receive the aft portion of the tension member and normally maintain it on a coaxial path with the collar and out of binding engagement with the aft portion of the main body.

* * * * *